US009061768B2

(12) United States Patent
Hansom et al.

(10) Patent No.: US 9,061,768 B2
(45) Date of Patent: Jun. 23, 2015

(54) ELECTROSTATIC DISCHARGE PROTECTED STRUCTURE PASS-THRU

(75) Inventors: Christopher Michael Hansom, Seattle, WA (US); James P. Irwin, Renton, WA (US); Nathan Michael Kelley, Everett, WA (US)

(73) Assignee: The Boeing Company, Chicago, IL (US)

(*) Notice: Subject to any disclaimer, the term of this patent is extended or adjusted under 35 U.S.C. 154(b) by 365 days.

(21) Appl. No.: 13/277,471

(22) Filed: Oct. 20, 2011

(65) Prior Publication Data

US 2013/0099067 A1    Apr. 25, 2013

(51) Int. Cl.
| B64D 37/04 | (2006.01) |
| B64D 37/00 | (2006.01) |
| B64D 37/32 | (2006.01) |

(52) U.S. Cl.
CPC ............ B64D 37/00 (2013.01); *Y10T 29/4995* (2013.01); B64D 37/32 (2013.01); *Y02T 50/44* (2013.01); B64D 37/005 (2013.01)

(58) Field of Classification Search
CPC .......... B64D 37/00; B64D 37/32; B64C 1/34; B64C 5/02; B64C 5/12; Y02T 50/44
USPC ........... 248/56, 561, 580, 636, 634, 608, 609; 244/219, 135 R; 285/123.15, 50, 154.1, 285/334.5, 414, 235, 337, 374, 405, 406; 252/502
See application file for complete search history.

(56) References Cited

U.S. PATENT DOCUMENTS

| 2,382,970 | A | * | 8/1945 | Borcherdt | ...................... 248/56 |
| 2,460,032 | A | * | 1/1949 | Risley | ............................ 285/233 |
| 2,681,778 | A | * | 6/1954 | Hughes | ..................... 244/135 R |
| 2,747,898 | A | * | 5/1956 | Wiltse | ............................ 285/369 |
| 2,813,692 | A | * | 11/1957 | Peterson et al. | ................. 248/56 |
| 3,136,501 | A | * | 6/1964 | Barber | ........................... 244/219 |

(Continued)

FOREIGN PATENT DOCUMENTS

| DE | 20 2005 004339 U1 | 9/2005 |
| EP | 0 297 990 | 1/1989 |

(Continued)

OTHER PUBLICATIONS

Federal Aviation Administration, "Policy on Issuance of Special Conditions and Exemptions Related to Lightning Protection of Fuel Tank Structure," Memo No. ANM-112-08-002, Memorandum dated May 26, 2009.

(Continued)

*Primary Examiner* — Anita M King
(74) *Attorney, Agent, or Firm* — Baldauff IP, LLC; Michael J. Baldauff, Jr.

(57) ABSTRACT

A mounting system for tubular structures within a wing structure provides for positioning of the tubular structure as it passes through wing ribs. The system provides for electrostatic protection from discharges between the rib and the tubular structure, and accommodates offset tubular positioning. A mounting flange is attached to an aperture in the wing rib, and the tubular structure is inserted through an aperture in the mounting flange. Once the tubular structure is positioned, a cushion mount comprising two pieces is inserted into the flange structure, holding the tubular structure in position in the mounting flange. The cushion mount may have a concentric aperture or an offset aperture to accommodate an offset positioned tubular structure in the wind rib aperture.

20 Claims, 8 Drawing Sheets

(56) References Cited

U.S. PATENT DOCUMENTS

| | | | |
|---|---|---|---|
| 3,627,357 A * | 12/1971 | Sanders | 285/148.17 |
| 4,530,478 A * | 7/1985 | McClellan | 248/62 |
| 4,544,188 A * | 10/1985 | Dugger | 285/337 |
| 4,804,158 A * | 2/1989 | Collins et al. | 248/74.4 |
| 4,940,259 A * | 7/1990 | Williams | 285/3 |
| 4,985,801 A | 1/1991 | Hellard et al. | |
| 5,725,709 A * | 3/1998 | Jensen | 156/169 |
| 5,973,903 A | 10/1999 | Tomerlin | |
| 7,278,190 B2 * | 10/2007 | Fischer et al. | 24/530 |
| 7,770,848 B2 | 8/2010 | Johnson et al. | |
| 2006/0006611 A1 | 1/2006 | Foerg | |
| 2009/0256352 A1 | 10/2009 | Petit et al. | |
| 2010/0001512 A1 | 1/2010 | Breay et al. | |
| 2010/0003840 A1 | 1/2010 | Breay et al. | |

FOREIGN PATENT DOCUMENTS

| | | |
|---|---|---|
| EP | 2 034 228 | 3/2009 |
| EP | 2 354 003 A1 | 8/2011 |

OTHER PUBLICATIONS

Federal Aviation Administration, "Fuel Tank Flammability," AC 25.981-2A, Sep. 19, 2008.

International Search Report & Written Opinion dated Feb. 8, 2013 in PCT Application No. PCT/US2012/056409.

International Search Report and Written Opinion dated Oct. 17, 2013 in PCT/US2012/062000.

* cited by examiner

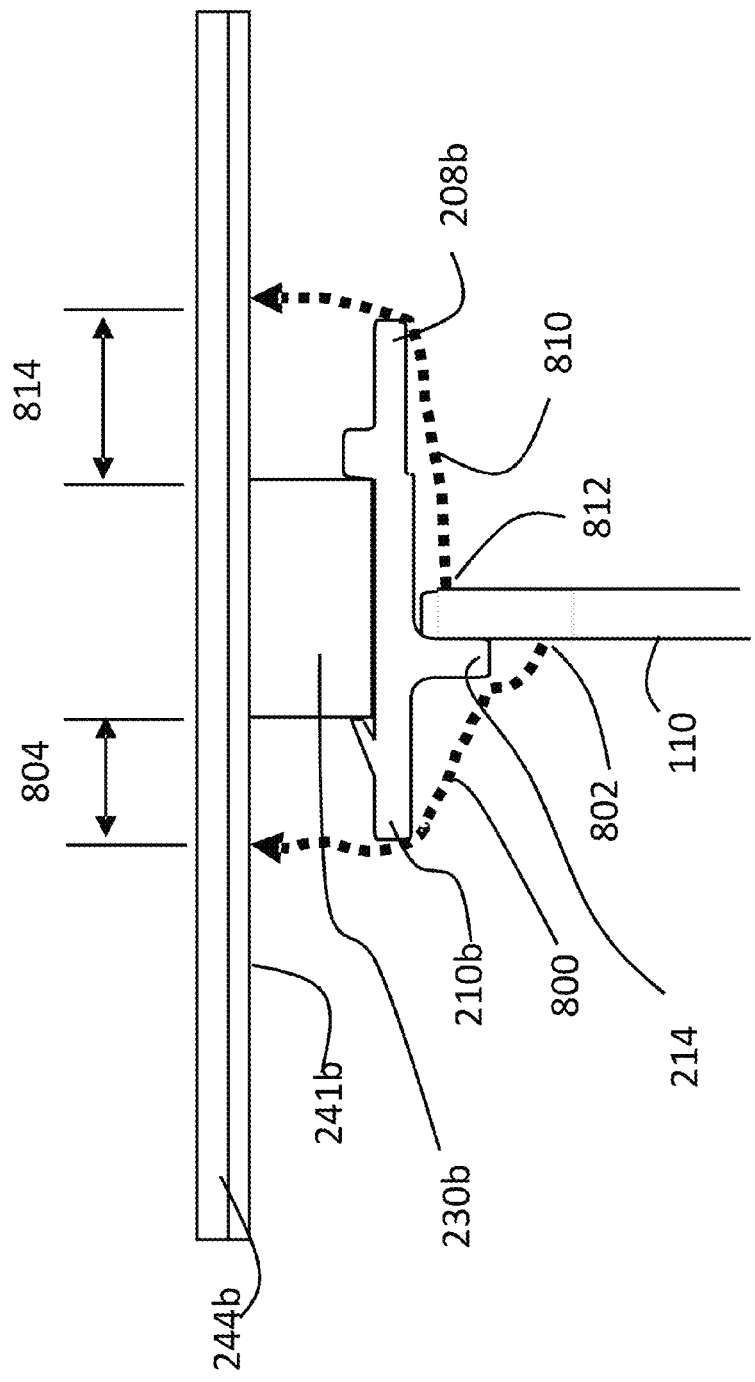

ELECTROSTATIC DISCHARGE PROTECTED STRUCTURE PASS-THRU

FIELD OF THE DISCLOSURE

The disclosure generally pertains to protecting tubular components as they pass through structural members, such as a wing rib of an aircraft, from electrostatic discharge.

BACKGROUND

Aircraft frequently are designed so that fuel tanks are incorporated into the wing structures. This necessitates installation of tubular components for conveying fuel from the fuel tank to various locations internal or external to the fuel tank. Frequently, the tubular components must pass through other structural members, such as wing ribs. This requires a support system for protecting the fuel tubes from abrasion and damage. Because fuel is combustible, it is necessary for the support system to protect the fuel tubes from any potential ignition sources.

Sparks are one type of ignition source that fuel lines should be protected from, and these are a form of electrostatic ("ES") discharge. Aircraft are subject to buildup of static electricity, which can occur in flight or on the ground, due to wind friction, lightening, contacting ground equipment, or other sources. It is possible that an ES discharge can occur between components internal to the aircraft, including the fuel tubes. Extreme care must be taken so that no ignition source is presented to the fuel system, including preventing any ES discharge to the fuel tubes.

Any system for installing tubular components in an aircraft should also minimize weight. It is desirable that any system involve as few as possible the number of parts to facilitate installation and maintenance. Therefore, systems and methods are needed to easily, inexpensively, and effectively provide for the installation and electrical isolation of fuel system components.

It is with respect to these and other considerations that the disclosure herein is presented.

SUMMARY

It should be appreciated that this Summary is provided to introduce a selection of concepts in a simplified form that are further described below in the Detailed Description. This Summary is not intended to be used to limit the scope of the claimed subject matter.

The disclosure is generally directed to providing a mounting structure that provides electrostatic protection for fuel lines installed in an aircraft that also provides an easy, inexpensive, and effective method for installation.

In one embodiment, a system for restraining a tubular structure through a planar structure includes a mounting flange and a cushion mount. The mounting flange includes a collar stop having a first side and a second side, the first side configured to contact the planar structure. The mounting flange has a sleeve having a front portion and a rear portion, wherein the rear portion extends perpendicular through a first aperture in the planar structure, wherein the sleeve forms a receptacle. The mounting flange also has a retention stop having a circular shape formed on the sleeve. The cushion mount includes a first half having a semi-circular outer shape, and a second half having the semi-circular outer shape, wherein the first half and the second half are configured to be received into the receptacle and contact the retention stop thereby forming a second aperture, and wherein the cushion mount is configured to restrain the tubular structure in the second aperture formed by joining the first half and the second half.

In another embodiment, a system for mounting a fuel tube in a wing structure includes a fuel tube encased in a sleeve for dissipating an electrical discharge, the fuel tube positioned perpendicular to a wing rib and passing through a wing rib aperture. The system also includes a cushion mount including a first half and a second half forming an aperture through which the fuel tube passes thereby preventing any lateral movement of the fuel tube relative to the wing rib. The system also includes a mounting flange formed from an electrically insulative material that includes a collar stop configured to contact the wing rib around an aperture in the wing rib, and a receptacle comprising a sleeve oriented perpendicular to the collar stop configured to receive the cushion mount, wherein the cushion mount is fixed within the receptacle.

In another embodiment, a method for installing a tubular structure in a wing rib includes the operations of inserting a mounting flange in an aperture in the wing rib, wherein the mounting flange comprises a receptacle forming an aperture in the mounting flange, affixing the mounting flange to the wing rib, and passing the tubular structure through the aperture in mounting flange. The operations also include inserting a first half of a mounting cushion and a second half of the mounting cushion into the receptacle such that the mounting cushion secures the tubular structure from lateral movement in the aperture in the mounting flange, and affixing the first half of the mounting cushion and the second half of the mounting cushion in the receptacle.

The features, functions, and advantages that have been discussed can be achieved independently in various embodiments of the present disclosure or may be combined in yet other embodiments, further details of which can be seen with reference to the following description and drawings.

BRIEF DESCRIPTION OF THE DRAWINGS

FIG. 8 illustrates two possible electric discharge paths with respect to the mounting flange sleeve as disclosed herein.

DETAILED DESCRIPTION

The following detailed description is generally directed to a system for installing tubular components, such as a fuel tube in the wing of an aircraft. Although described in the context of an aircraft, the concepts and technology presented herein could apply to other structures or applications, including industrial plants, ships, submarines, or other types of vehicles.

Aircraft frequently incorporate fuel tanks that are designed in the wing structures, so that the wing ribs may be part of the fuel tanks Fuel lines, in the form of fuel tubes, are required to convey fuel from one tank to another, or to the engine. The fuel lines frequently pass through bulkheads or the wing ribs, and it is at this point that the fuel lines are subject to abrasion, stress, and potential electrical sources acting as ignition sources.

The fuel system must be protected from potential ignition of vapor and fuel at every point in the fuel system. Federal regulation requires "that an ignition source could not result from each single failure, from each single failure in combination with each latent failure condition not shown to be extremely remote, and from all combinations of failures not shown to be extremely improbable. The effects of manufacturing variability, aging, wear, corrosion, and likely damage must be considered." (CFR 25.981(a)(3)). Thus, any system supporting the fuel tube as it passes through a wing rib must provide proper mechanical positioning of the fuel tube and proper electrostatic protection.

Figure 1:
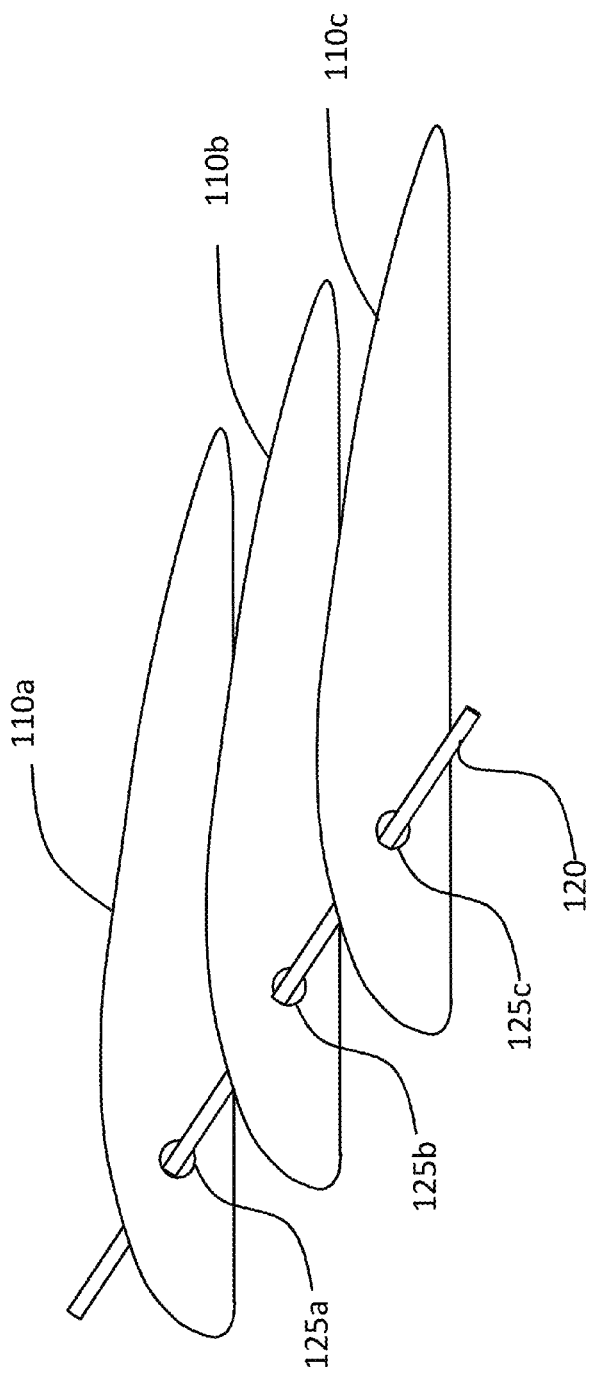
FIG. 1 illustrates the prior art of a tube passing through a plurality of ribs in the wing of an aircraft.

One prior art approach for passing the fuel tube within the wing of an aircraft is shown in FIG. 1. In FIG. 1, a fuel tube 120 passes through a wing structure comprising a collection of ribs 110a-110c. The ribs 110a-110c (collectively referred to as 110) generally are similar in profile and are spaced apart. The outer wing structure is not shown for clarity. The fuel tube 120 generally passes perpendicular to the rib, along the length of the wing structure; although in other instances it may pass at an angle to the ribs. A series of apertures 125a-125c (collectively referred to as 125) in the ribs are provided to accommodate the fuel tube. The "pass-thru" point is where the fuel tube 120 passes through the aperture 125.

The fuel tube may be made up of sections that are connected together using connectors (not shown in FIG. 1). The apertures 125 must be large enough to allow the fuel tube to be canted at an angle and maneuvered about when installed.

The ribs 110 may be either internal or external to the fuel tank. In some embodiments, the fuel tank may be configured within the wing so that fuel tank incorporates the ribs. In other embodiments, fuel tanks may be located between adjacent ribs and connected by one or more fuel tubes.

The context shown in FIG. 1 illustrates potential consequences if there is no protection between the rib 110 and the fuel tube 120 at the pass-thru point. Each pass-thru location can result in potential mechanical abrasion between the fuel tube and the rib that occurs with vibration of the aircraft, resulting in potential damage of the fuel tube and/or leakage of the fuel. Further, potential electrostatic ("ES") discharge can occur if the fuel tube contacts or is in proximity to the rib. Consequently, modern aircraft incorporate mechanisms to protect against abrasion and the potential of electrostatic discharge. However, these mechanisms often incorporate a number of components which increases cost and assembly time.

In one embodiment disclosed herein that reduces cost and assembly time, a mechanical structure for mounting the fuel tube and ensuring electrical isolation can be provided by a mounting flange attached to each rib at the pass-thru point. Each mounting flange includes a cushion mount that holds the fuel tube in the desired location and isolates the fuel tube from electrostatic discharge from the rib. The cushion mounts are available in different configurations, as will be seen, to facilitate installation.

Figure 2:
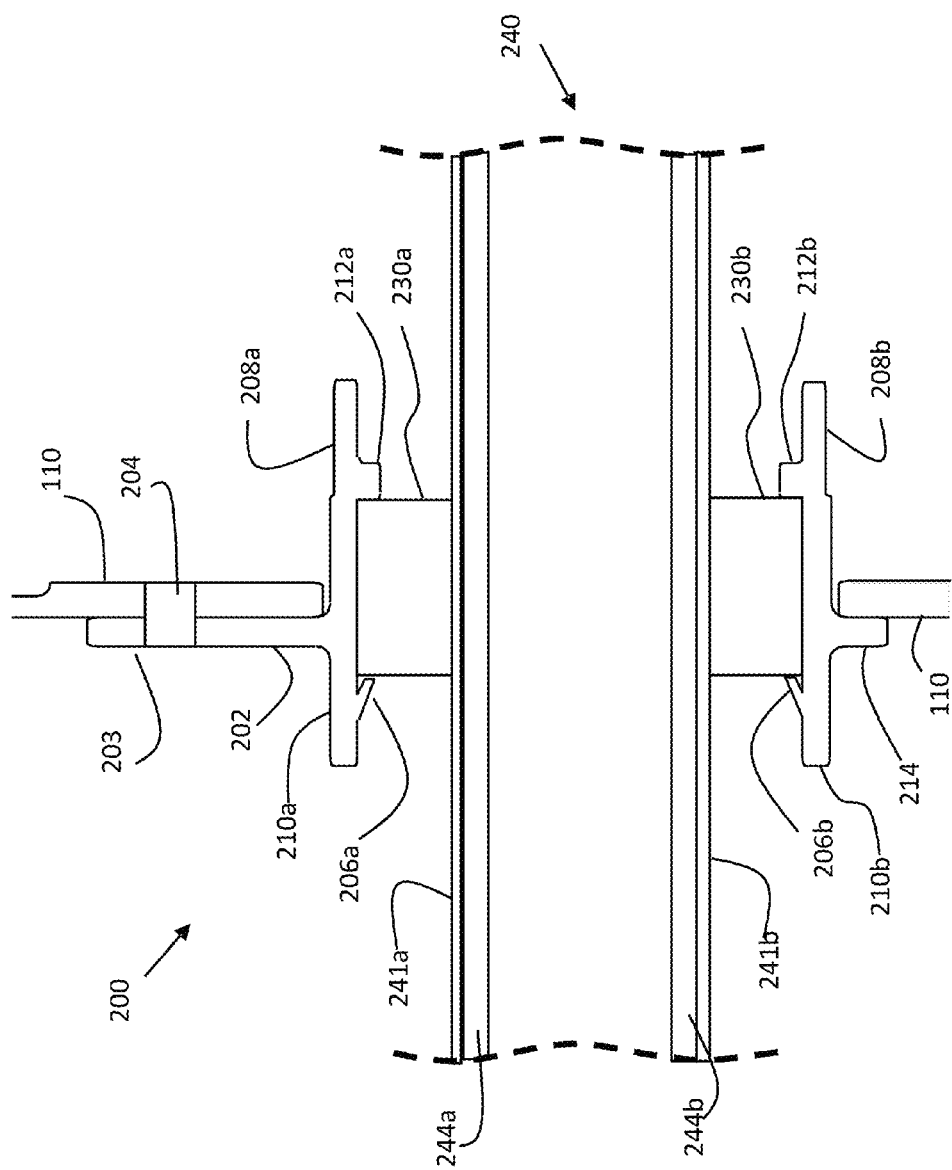
FIG. 2 illustrates a cross-sectional view of a mounting flange, cushion mount, and fuel tube according to one embodiment disclosed herein.

Turning to FIG. 2, FIG. 2 illustrates a cross-sectional view of an electrostatic discharge protection bulkhead pass-thru assembly 200 ("pass-thru assembly"). The pass-thru assembly comprises a mounting flange 202 and the cushion mount comprising two half portions 230a and 230b (collectively referred to as 230). Generally, reference to "cushion mount" refers to the two half portions 230a, 230b. The pass-thru assembly 200 functions in part to hold a fuel tube assembly 240 in position with respect to the aperture in the rib. Reference to the fuel tube assembly 240 does not include the pass-thru assembly 200 as these are distinct assemblies.

FIG. 2 illustrates a cross-sectional view of the pass-thru assembly, and for purposes of describing the components, several aspects of the structure are described using the terms "front", "back", "top" and "bottom". However, these descriptors are relative to the orientation of the pass-thru assembly as depicted in FIG. 2. Nothing prevents the components from being positioned in another orientation. Use of these terms is for convenience of explanation, and does not require or imply any particular orientation of the components described herein. Reference to the "front" side refers to the left portion or side of FIG. 2, and reference to the "back" side refers to the right portion of FIG. 2. The "top" side generally refers to the portions of the pass-thru assembly above the fuel tube assembly 240, and the "bottom" side generally refers to the portions of the pass-thru assembly below the fuel tube assembly 240.

The mounting flange 202 comprises in one embodiment three mounting tabs. In the orientation of FIG. 2, one mounting tab 203 is readily seen. The mounting tab comprises an aperture 204 extending through the mounting tab and aligning with a corresponding aperture in the rib 110. A bolt, screw, or other mechanical fastener (not shown in FIG. 2) can be used to fasten the mounting flange to the rib 110. In other embodiments, as will be discussed below, the fastener can be a single piece of deformable plastic, configured to snap in, and attaches the mounting flange 202 to the rib 110. Other embodiments of the mounting flange may not incorporate the mounting tab 203, but may rely on other mechanisms, as will be seen.

The mounting flange 202 includes a sleeve. The sleeve is described as having a front portion 210a, 210b (collectively referred to as 210) and a rear portion 208a, 208b (collectively referred to as 208). The left portion of the diagram (as divided by a centerline of rib 110) is considered the front side of the mounting flange 202 and hence the sleeve on this side is referred to as the front portion 210. The mounting flange 202 is a single piece, and the front portion comprising sleeve 210a, 210b is circular in shape (as will be seen in FIG. 4). Thus, the cross-sectional view of FIG. 2 illustrates the sleeve that can be referred to as having a top, front portion 210a; a top, back portion 208a; a bottom, front portion 210b; and a bottom, back portion 208b.

The front sleeve portion 210 incorporates an integral flexible retention key 206a, 206b (collectively referred to as 206) which functions to hold the cushion mount to half portions 230a, 230b in place after the cushion mount has been inserted into a receptacle formed by the front and rear portions.

The mounting flange 202 also incorporates the rear portion 208, which extends out from the back side. The rear portion incorporates an integral inflexible retention stop 212a, 212b (collectively referred to as 212). The inflexible retention stop 212 functions to hold the cushion mount 230 when inserted into the receptacle of the mounting flange. The rear portion 208 extends out beyond the inflexible retention stop 212, and as it will be described below, this extension aids in providing ES protection.

The mounting flange 202 incorporates a semi-circular shaped collar stop 214, which is partially seen in the bottom portion of FIG. 2 because of the depicted orientation. The collar stop 214 has a shape that includes portions of a circular, but in-between the circular portions the shape merges with the mounting tabs 203. The collar stop 214 along with the mounting tabs 203 provides a contact surface between the mounting flange 202 and the rib 110.

The mounting flange 202 is a single component, which can be made from an epoxy resin, nylon, or other materials. In one embodiment, the material is selected so that it is an electrical insulator and does not conduct electrical charge between the rib 110 and the fuel tube assembly 240. The material is selected so that it is suitably non-conductive or electrically isolating.

The mounting flange receives the cushion mount 230 once the cushion mount is inserted into a receptacle formed by the front portion 210. The cushion mount comprises two half portions, 230a, 230b, though this is not readily evident from the view provided by FIG. 2. The two pieces, as will be seen, are inserted into the mounting flange and snapped into the receptacle. The cushion mount functions to hold the fuel tube assembly 240 in position.

In FIG. 2, the two half portions 230a, 230b of the cushion mount are sized so that the fuel tube assembly 240 is approximately centered between the sleeves 210 of the mounting flange 202 at every point around the circumference. This reflects one embodiment of the cushion mount which is termed a concentric cushion mount 230. (See, also, FIG. 4 below.) In other embodiments, an offset cushion mount may be used (see, e.g., FIG. 6) so that the tube assembly is off-centered with respect to the mounting flange.

In FIG. 2, the fuel tube assembly 240 is shown as comprising a fuel tube 244a, 244b (collectively referred to as 244) and a protective electrostatic discharge sleeve 241a, 241b (collectively referred to as 241). The fuel tube 244 and sleeve 241 are each one-piece components. In one embodiment, the sleeve 241 provides additional electrostatic discharge protection of the fuel tube 244. Collectively, the fuel tube 244 and sleeve 241 are referred to as the fuel tube assembly 240.

Figure 3:
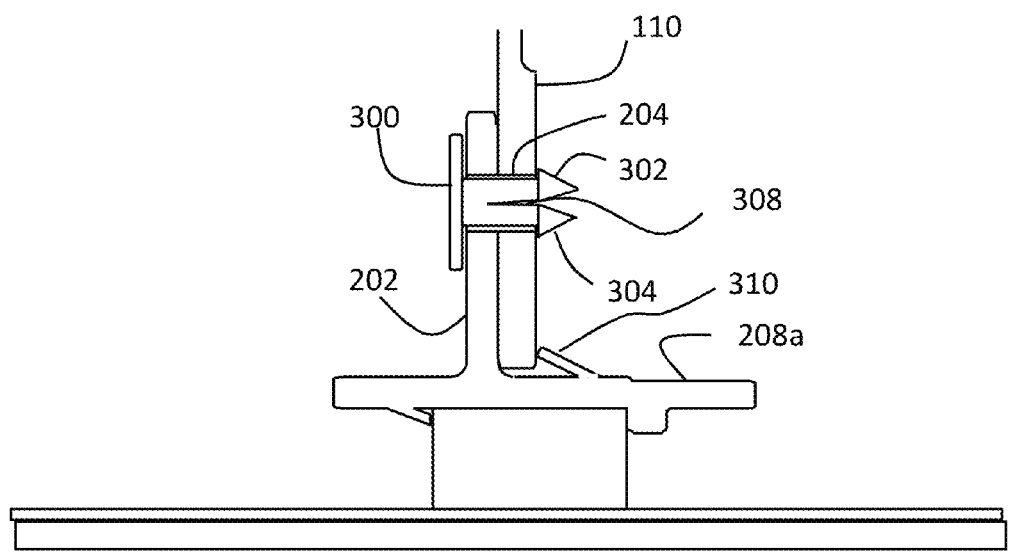
FIG. 3 illustrates different structures for fastening the mounting flange to the rib according to embodiments disclosed herein.

Other embodiments may incorporate other approaches for fastening the mounting flange to the rib. Turning briefly to FIG. 3, two alternative approaches are disclosed. In FIG. 3 the upper portion of the mounting flange 202 is shown. In this embodiment, a fastener pin 300 is used to affix the mounting flange 202 to the rib 110. The fastener pin 300 can be made of plastic, nylon, epoxy resin, polyether ether ketone (PEEK), or other types of composite materials. The fastener pin has two barbs 302, 304, which are separated by a slit 308, such that they are squeezed together when inserting the pin in the aperture 204, and expand after they protrude past the aperture.

Another embodiment shown in FIG. 3 involves using a flexible retention key 310. This operates using a similar principle as the flexible retention key 206 previously discussed, except that this retention key functions to retain the mounting flange 202 in the rib. The flexible retention key 310 and/or the fastener pin 300 can be used separately, or in combination. Those skilled in the art may devise other fastening approaches for retaining the mounting flange in the rib.

Figure 4:
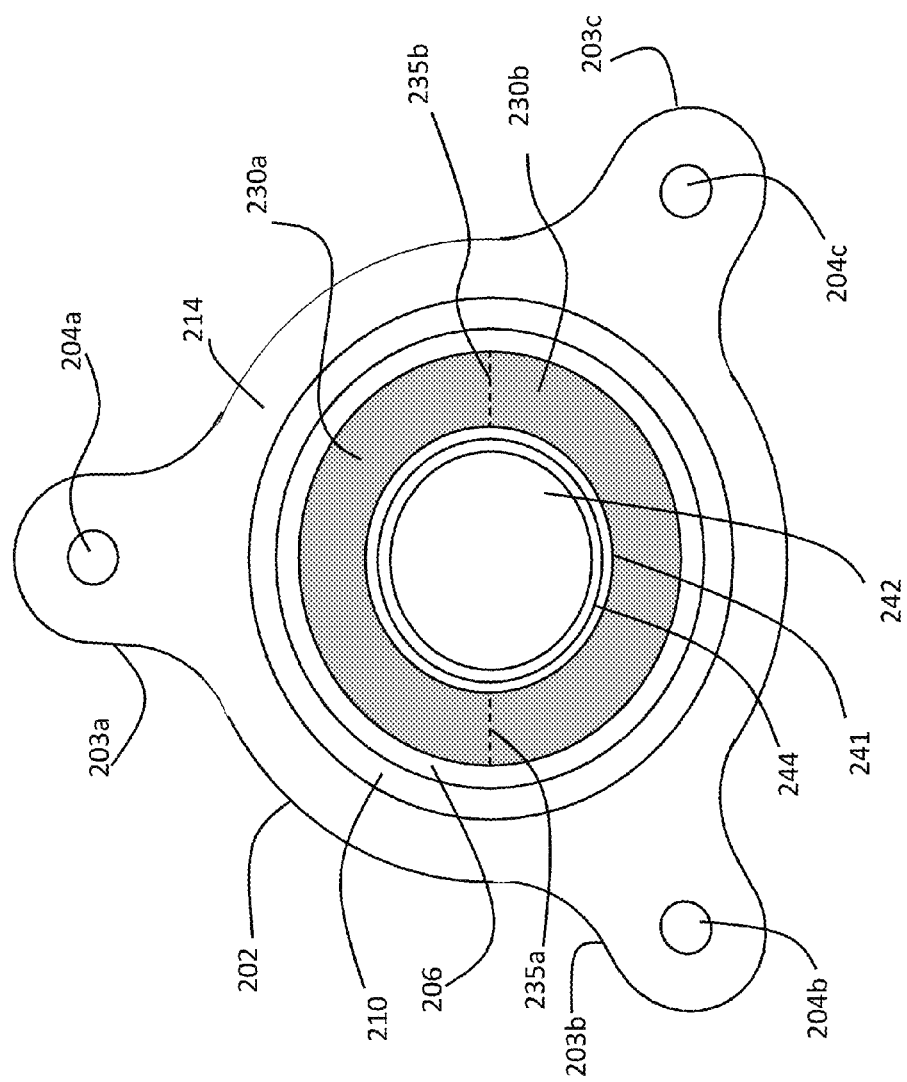
FIG. 4 illustrates a front view of the mounting flange, cushion mount, and fuel tube according to one embodiment disclosed herein.

Turning to FIG. 4, FIG. 4 illustrates a front side of the mounting flange, cushion mount, and tube assembly according to one embodiment disclosed herein. Specifically, the side view of FIG. 4 is of the left side of the mounting flange 202 as shown in FIG. 2. In FIG. 4, the three mounting tabs 203a, 203b, and 203c (collectively referred to as 203) are clearly delineated with their respective apertures 204a, 204b, and 204c. The outer profile of the mounting tabs 203 eventually transform into the collar stop 214 which has a semi-circular shape between the mounting tabs. If the mounting tabs 203 are not present in some embodiments, then the collar stop 214 is circular (not semi-circular) in shape.

The next structure is the front portion 210 that forms in part a receptacle configured to receive the cushion mount 230. The cushion mount 230 is held in place by the flexible retention key 206. The cushion mount 230 comprises a first half portion 230a and a second half portion 230b. These two halves are delineated by a seam 235a, 235b (collectively referred to as 235) where the two half portions 230a, 230b meet.

Finally, within the aperture formed by the cushion mount 230 is located the tube assembly comprising the fuel tube 244, which is enveloped in a sleeve 241. The passageway 242 of the fuel tube is shown in this embodiment as concentric with the cushion mount 230 and the mounting flange 202.

Figure 5:
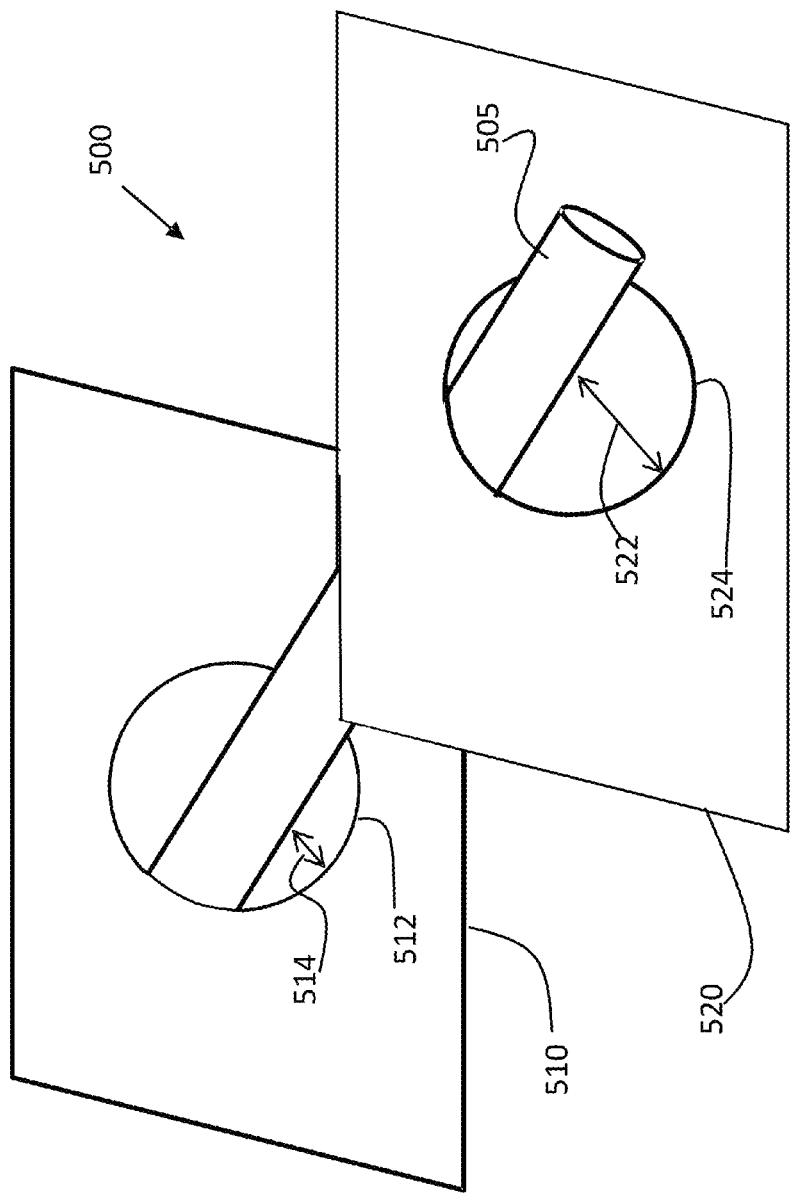
FIG. 5 illustrates one embodiment of a non-concentric fuel tube configuration as disclosed herein.

However, in many embodiments, the fuel tube may not be concentric with the aperture in the rib. This is illustrated in FIG. 5, which illustrates a non-concentric or offset fuel tube arrangement 500. As seen in FIG. 5, portions of two ribs 510, 520 are depicted: a first rib 510 and a second rib 520, which have respective apertures 512, 522. A fuel tube 505 is also depicted, but the fuel tube is not positioned in each aperture in the same manner. Specifically, in this illustration, the distance 514 of the fuel tube 520 in the first rib aperture 512 is different from the distance 522 in the second rib aperture 524. This condition can be due to installation or fabrication variances with respect to the aperture, or position of the tube. The condition depicted in FIG. 5 is exaggerated to illustrate the offset condition of the fuel tube 505 and the aperture 512.

An offset fuel tube arrangement can result in pre-loading stress if the offset condition is not properly accommodated. Specifically, if the fuel tube 505 is forced laterally to the center of the aperture when using a concentric pass-thru assembly, lateral stress can be introduced to the fuel tube 505. It is generally preferable to avoid such lateral stresses.

Figure 6:
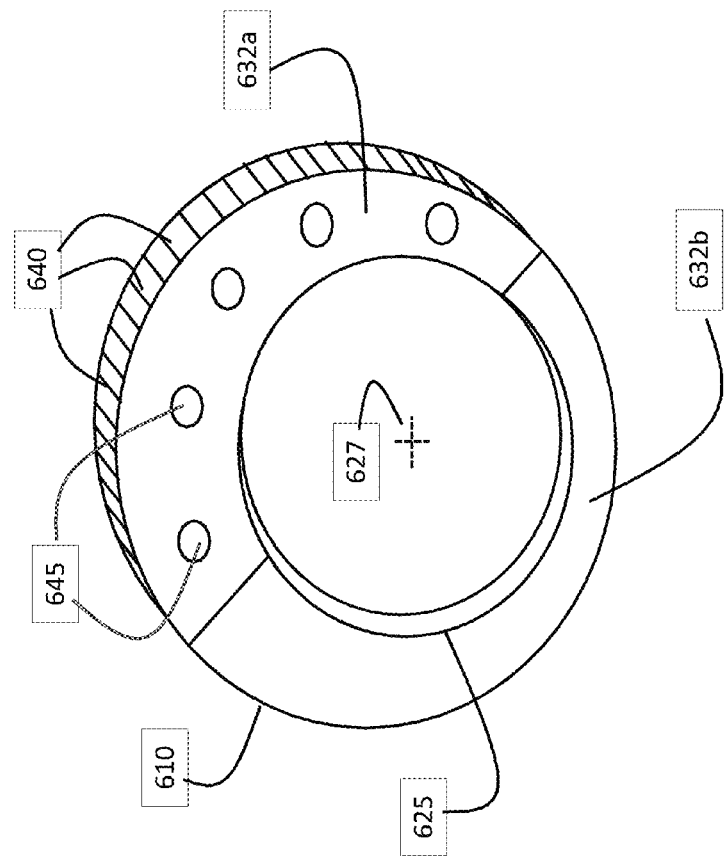
FIG. 6 illustrates a perspective view of one embodiment of an offset cushion mount according to one embodiment disclosed herein.

An approach to address an offset fuel tube arrangement is to use an offset cushion mount, which is illustrated in FIG. 6. FIG. 6 illustrates a perspective view of an offset cushion mount according to one embodiment disclosed herein. The cushion mount again comprises two pieces, 632a, 632b (collectively referred to as 632) that are depicted adjacent to each other, as they would be positioned when inserted into the mounting flange. The cushion mount 632 forms an aperture defined by a circumference 625 having a center 627 that is offset from the center defined by the circumference 610 of the overall cushion mount. The cushion mount 632 can be rotated prior to being inserted into the mounting flange, so that the offset can be in the desired position to accommodate the offset fuel tube. Different sizes of cushion mounts can be made to reflect different levels of offset.

In addition, different sizes of cushion mounts can be available to accommodate different sizes of tubing. For example, in one embodiment the cushion mount is configured to hold 1" diameter tubing. The same mounting flange could accommodate a cushion mount that is configured to hold 0.5" diameter tubing. Thus, a single mounting flange could be used to secure different sized tubes by merely using different sized cushion mounts.

Once the offset cushion mounts are installed in the mounting flange, the cushion mounts should not rotate. An offset cushion mount that is initially configured for an offset tube will not produce any lateral forces. However, once the cushion mount is rotated, it will then produce lateral force on the fuel tube. To prevent rotation of the offset cushion mount once it is installed, serrated edges 640 can be incorporated into the cushion mount. These may mate with serrated edges within the receiving sleeve in the mounting flange, and facilitate prevention of rotation after installed. Other types of structures (e.g., bumps, ridges, etc.) can be used to prevent the cushion mount from rotating.

In other embodiments, a series of notches can be formed at the outer edge of the cushion mount which engage in a key protruding within the mounting flange sleeve. The notches could be located every 22.5 degrees around the perimeter of the cushion mount, providing for sixteen different orientations. Those skilled in the art will be able to recognize that other mechanisms for preventing rotation of the cushion mount may be incorporated into the pass-thru assembly. In other embodiments, a series of apertures 645 can be formed in the cushion mount 632a for saving weight. The apertures can be of various sizes and configurations. Other embodiments may otherwise hollow out the interior portion of the cushion mount to reduce weight.

The serrated edges or notches could be incorporated into the concentric (e.g., non-offset) cushion mount 230 as well, such as the cushion mount depicted in FIG. 4. Rotation of a concentric cushion mount will not produce lateral forces on the fuel tube. Thus preventing rotation of a concentric cushion mount is not as critical, but incorporating the same anti-rotation mechanism on all the cushion mounts ensures compatibility with the mounting flange.

Figure 7:
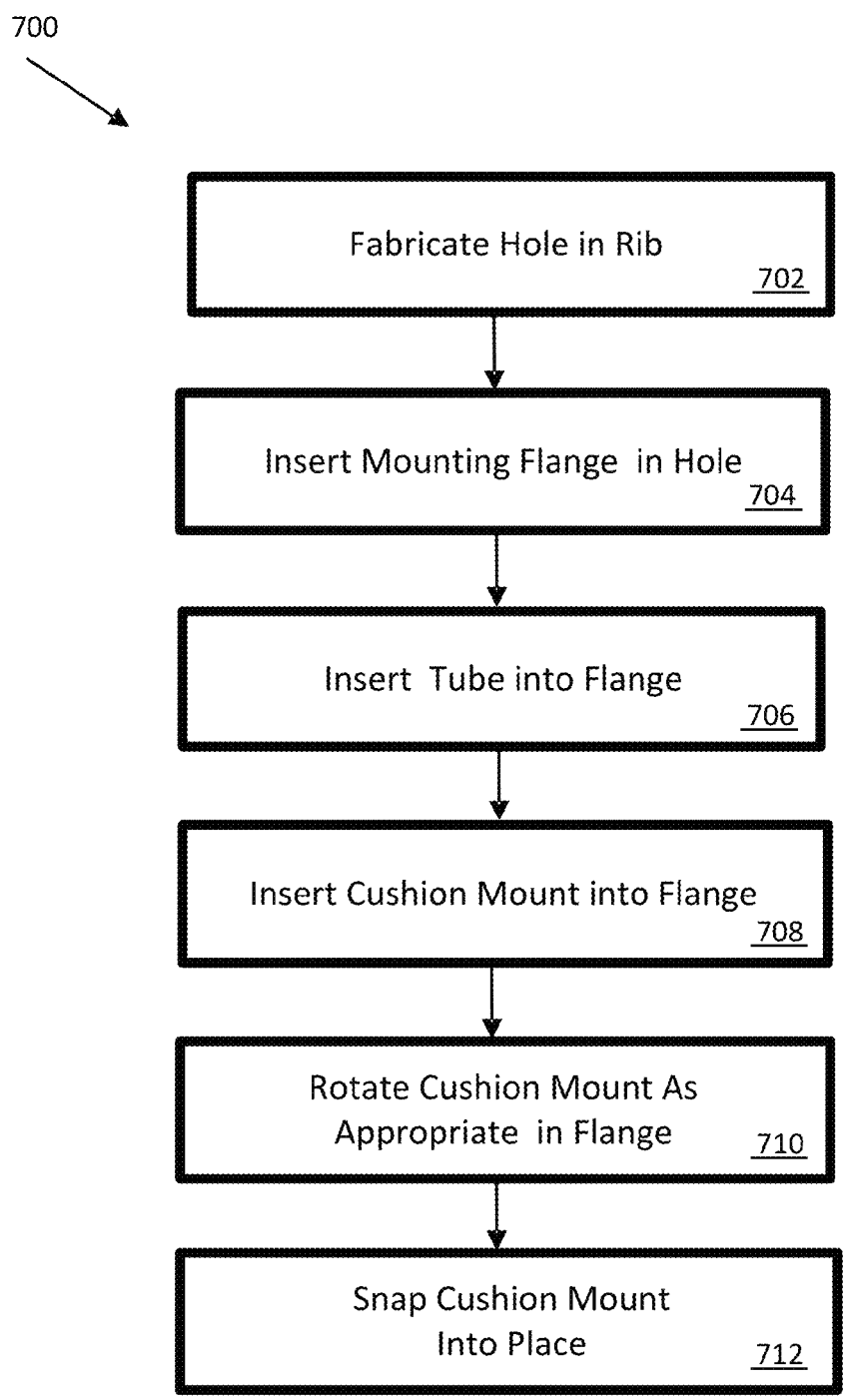
FIG. 7 illustrates a process flow for installing the mounting flange, fuel tube, and cushion mount according to one embodiment disclosed herein.

The process for installing the pass-thru assembly is now addressed. FIG. 7 illustrates a process flow 700 for installing the mounting flange, fuel tube, and cushion mounts according to one embodiment disclosed herein. The process begins with operation 702 wherein an aperture is fabricated in the wing rib. Although illustrated in the context of a wing rib, the operation can apply to any other planar structure through which the tubular structure passes. For example, the process could be applied to installation of other tubular structures, including hydraulic lines, electrical conduit, gas lines, etc.

In operation 704, the mounting flange is inserted into the aperture. As noted before, three bolts may be used to fasten the mounting flange to the rib. As noted previously, other fastening means may be used in other embodiments.

In operation 706, the tubular structure is inserted into the mounting flange. The fuel tube may be installed in sections, and the maximum length of the tube that can be inserted may be limited by the distance between the ribs. Typically, to accommodate canting the tube during installation, the diameter of the aperture of the mounting flange (without the cushion mount) is at least approximately twice the diameter of the tube.

Once the fuel tube is installed and positioned, then the cushion mount can be inserted in operation 708. At this point, the one of several types of cushion mounts are selected based on the level of offset required. Typically, though not necessarily, three different types of cushion mounts may be available. This includes a concentric cushion mount (no offset), a slight offset, and a large offset. Other embodiments may have greater or fewer number of different types of cushion mounts.

In operation 710, the cushion mount is rotated as appropriate. For concentric cushion mounts, this operation is not relevant, since any angle of rotation results in the fuel tube being positioned in the center. In situations where there is an offset, then rotating the cushion mount will allow alignment of the tube as appropriate. Although reference is made to rotation the cushion mount (singular), it should be understood that this involves rotating both pieces of the cushion mount in unison.

In operation 712, the cushion mount are snapped into the receiving portion of the flange mount. This can be accomplishing by pushing the mounts against the collar stop until the flexible retaining key retains the cushion mount. These operations may be repeated as necessary in whole or in part until all the pass-thru assemblies have been installed.

The above components not only function to retain the tubular structure with the wing rib, but also function to provide ES protection. Electrostatic discharge occurs when the voltage potential between two components exceeds a threshold level. The voltage potential can occur by a buildup of charge due to wind friction, a lighting strike, a short circuit, etc. In this case, the two components involving a discharge that are of concern are the fuel line and the rib. In various embodiments, the wing rib may be constructed of metal, and hence conductive to electricity. Thus, it is assumed that the ribs may have a build-up of static electricity.

One approach for mitigating electromagnetic discharge is to use non-metal components, such as epoxy resins, plastics, or other non-conductive materials for the pass-thru assembly. The mounting flange and the cushion mount are constructed of materials which have a high resistance to electricity, such as epoxy resin, plastic, rubber, etc. Thus, both the mounting flange and the cushion mount are resistive to conducting an ES discharge. In one embodiment, the resistance of the mounting flange and/or cushion mount is a minimum of 10 kΩ/meter.

While these materials may be good insulators themselves, at some point the ambient air surrounding the mounting flange and the cushion mount can conduct a discharge from the wing rib to the fuel tube. Thus, another approach for mitigating electromagnetic discharge involves maintaining a certain air gap distance between these two components, in this case the fuel tube and the rib. Maintaining a certain air gap can be facilitated by using the shape of the mounting flange to increase the distance of the discharge.

This is addressed using FIG. 8, which depicts a portion of the mounting flange, fuel tube, cushion mount, and wing rib according to one embodiment. The path of any discharge will take the shortest path from the rib 110 to the fuel tube 244. This path varies as to whether the right side or the left side of the mounting flange is analyzed. In FIG. 8, two possible discharge paths are illustrated. The left discharge path 800 discharges from the rib 110 at origination point 802, bends around the bottom, front sleeve portion 210b, and then travels to the fuel tube 244. Because the collar stop 214 is pressed against the edge of the aperture in the rib 110, the discharge point originates below the collar stop 214.

However, the right discharge path 810, originates at a point 812 on the rib that is closer to the aperture in the rib, because there is no collar stop on this side. The path continues around the right sleeve 208b, and then to the fuel tube 244. However, the right sleeve 208b extends further to the side as compared to the left sleeve 210 in order to compensate for the different origination point of the discharge. In other words, the distance 814 from the end of the right sleeve to the cushion mount is greater than the distance 804 from the end of the left sleeve to the cushion mount. This extra length compensates for the closer origination point 812 as compared to the left side.

In summary, the different sized sleeves ensure that the right discharge path 810 and the left discharge path 800 are of equal distance, providing equal discharge protection when the discharge travels through the air. This explains why the back portion of sleeve 208 extends further than the front portion of sleeve 210.

If the cushion mount is a concentric cushion mount, then the space between the sleeve and the fuel tube will be constant around the perimeter of the sleeve. However, if the cushion mount is a non-concentric cushion mount, then the distance between the sleeve and the fuel tube will not be constant.

Depending on the offset level, the sleeve and the fuel tube may be relatively closer or farther apart depending on what point this is measured.

Added ES protection is provided by using an electrostatic discharge sleeve 241b over the fuel tube to dissipate the discharge. Thus, even if the discharge does occur between the rib 110 and the fuel tube assembly, the electrostatic discharge sleeve 241b provides additional protection from the fuel tube itself dissipating the energy.

Those skilled in the art will recognize that the concepts and technology presented herein can be embodied in various ways. The subject matter described above is provided by way of illustration only and should not be construed as limiting. Various modifications and changes may be made to the subject matter described herein without following the example embodiments and applications illustrated and described, and without departing from the true spirit and scope of the present disclosure, which is set forth in the following claims.

The invention claimed is:

1. A system for restraining a tubular structure through a planar structure, comprising:
    a mounting flange comprising
        a collar stop having a first side and a second side, the first side configured to contact the planar structure,
        a sleeve having a front portion and a rear portion, wherein the rear portion extends perpendicular through a first aperture in the planar structure such that the sleeve extends through the first aperture outwardly from a front surface and a rear surface of the planar structure, the sleeve forming a receptacle, and
        a retention stop having a circular shape formed on the rear portion of the sleeve and spaced apart from the rear surface of the planar structure; and
    a cushion mount comprising
        a first half having a semi-circular outer shape, and
        a second half having the semi-circular outer shape,
        wherein the first half and the second half are configured to be received into the receptacle and contact the retention stop thereby extending through the first aperture outwardly from the front surface and the rear surface of the planar structure and forming a second aperture, and
        wherein the cushion mount is configured to restrain the tubular structure in the second aperture formed by joining the first half and the second half.

2. The system of claim 1, wherein the planar structure comprises a rib in a wing structure and the tubular structure is a fuel tube.

3. The system of claim 2, wherein the mounting flange comprises a flexible retention key and the collar stop configured to retain the cushion mount in the receptacle.

4. The system of claim 3, where the mounting flange comprises a third aperture having a diameter that is at least twice a diameter of the second aperture.

5. The system of claim 2, wherein the mounting flange comprises three mounting tabs, each mounting tab having an aperture configured to receive a fastener.

6. The system of claim 2, wherein the mounting flange and the cushion mount comprise electrically insulative materials.

7. The system of claim 1, wherein a first distance of an end of the front portion of the sleeve to the collar stop is shorter than a second distance of an end of the rear portion of the sleeve to the collar stop.

8. A system for mounting a fuel tube in a wing structure, comprising:
    a continuous length of a fuel tube encased in a first sleeve for dissipating an electrical discharge, the fuel tube positioned perpendicular to a wing rib and the continuous length of the fuel tube and the first sleeve passing through a wing rib aperture;
    a cushion mount comprising a first half and a second half forming an aperture through which the continuous length of the fuel tube and the first sleeve passes to preventing any lateral movement of the fuel tube relative to the wing rib, the cushion mount extending from a position forward of a front surface of the wing rib, through the wing rib aperture, and to a position spaced from a rear surface of the wing rib; and
    a mounting flange formed from an electrically insulative material comprising
        a collar stop configured to contact the wing rib around the wing rib aperture, and
        a second sleeve forming a receptacle configured to receive the cushion mount, wherein the cushion mount is fixed within the receptacle and wherein the second sleeve extends from a position forward of the collar stop and the front surface of the wing rib, through the wing rib aperture, and to a position spaced from the rear surface of the wing rib.

9. The system of claim 8, where the mounting flange comprises a plurality of fastener tabs configured to receive a fastener.

10. The system of claim 8, wherein the cushion mount is prevented from rotating within the receptacle.

11. The system of claim 8, wherein an aperture in the mounting flange has a diameter at least twice that of the aperture formed by the cushion mount.

12. The system of claim 8, wherein the mounting flange comprises a flexible retention key and a retention stop configured to retain the cushion mount in the receptacle.

13. The system of claim 8, wherein the aperture formed by the cushion mount is concentric with an aperture formed in the mounting flange.

14. A method for installing a tubular structure in a wing rib comprising:
    inserting a mounting flange in an aperture in the wing rib such that a collar stop of the mounting flange abuts a front surface of the wing rib and a sleeve of the mounting flange extends from a position forward of the collar stop and the front surface of the wing rib, through the aperture in the wing rib, and to a position spaced from a rear surface of the wing rib, wherein the mounting flange comprises a receptacle forming an aperture in the mounting flange;
    affixing the collar stop of the mounting flange to the wing rib;
    passing the tubular structure through the aperture in the mounting flange;
    inserting a first half of a mounting cushion and a second half of the mounting cushion into the receptacle such that the mounting cushion secures the tubular structure from lateral movement in the aperture in the mounting flange; and
    affixing the first half of the mounting cushion and the second half of the mounting cushion in the receptacle.

15. The method of claim 14, further comprising:
    rotating the first half and second half of the mounting cushion within the receptacle prior to affixing the first half of the mouthing cushion and the second half of the mounting cushion.

16. The method of claim 14, wherein affixing the first half of the mounting cushion and the second half of the mounting cushion comprises pressing the mounting cushion until retained in the receptacle by a retention key.

17. The method of claim 14, wherein each operation is repeated at least once.

18. A system for restraining a tubular structure passing through a planar structure comprising:
- a mounting flange comprising
  - a cylindrical sleeve having a front portion and a rear portion, wherein the rear portion extends perpendicular through a first aperture in the planar structure, the sleeve forming a receptacle therethrough,
  - a rigid retention stop having a circular shape formed on the rear portion, and
  - a flexible retention key formed on the front portion, the rigid retention stop and the flexible retention key formed unitarily with the sleeve; and
- a non-conductive cushion mount comprising
  - a first half having a semi-circular outer shape, and
  - a second half having the semi-circular outer shape,
  - wherein the flexible retention key deflects to a first position to enable the first half and the second half to be received into the receptacle and contact the retention stop and retracts to a second position to lock the first and second half within the receptacle, an interior of the cushion mount forming a second aperture, and
  - wherein the cushion mount is configured to restrain the tubular structure in the second aperture formed by joining the first half and the second half.

19. The system of claim 18, wherein the planar structure comprises a fuel tank bulkhead.

20. The system of claim 18, further comprising an electrostatic discharge sleeve disposed between the cushion mount and the tubular structure.

* * * * *